Feb. 15, 1927.  J. F. O'CONNOR  1,617,541
FRICTION SHOCK ABSORBING MECHANISM
Filed March 20, 1925
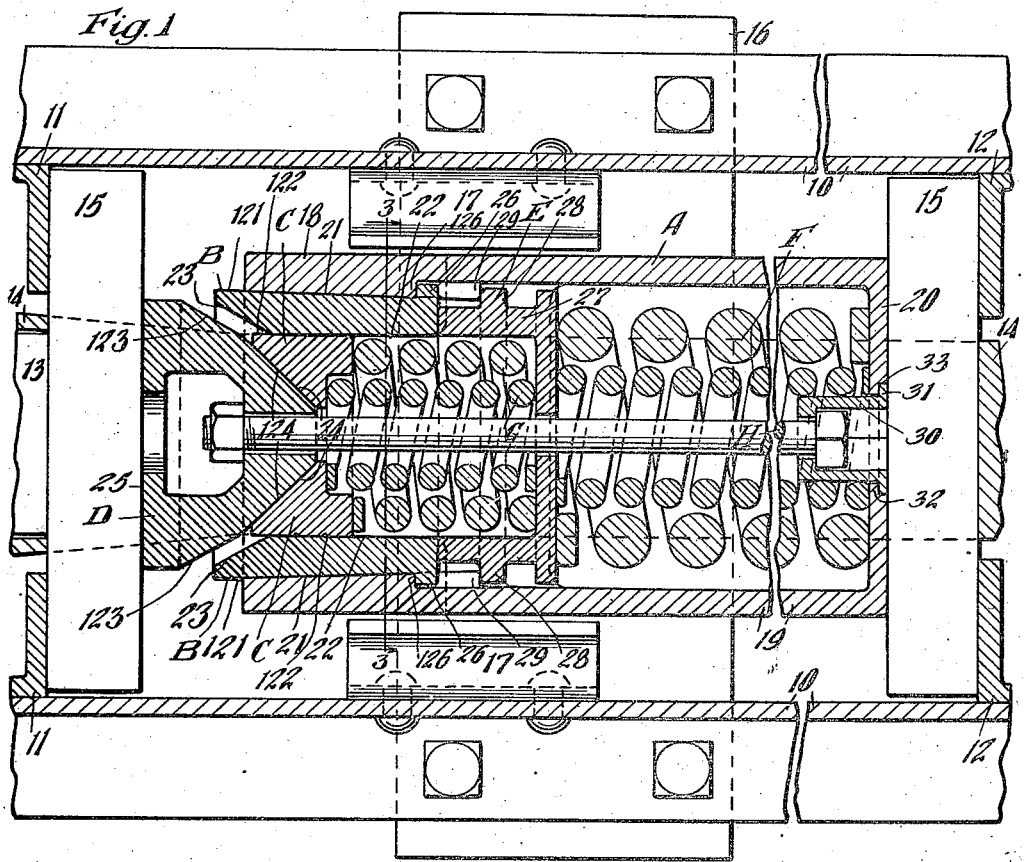
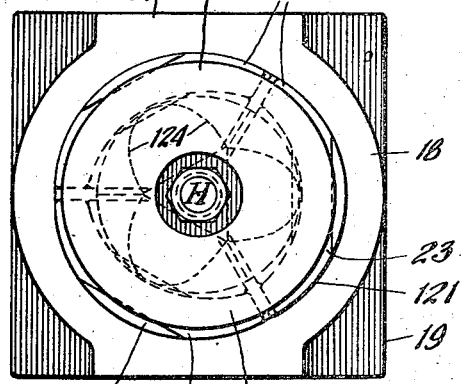
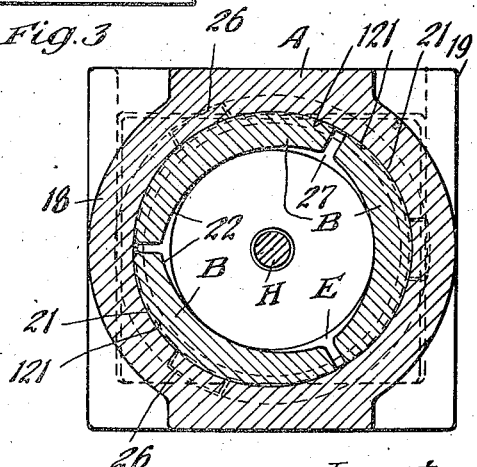
Witnesses
Wm. Geiger
Inventor
John F. O'Connor
By George J. Haight
His Atty.

Patented Feb. 15, 1927.

1,617,541

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 20, 1925. Serial No. 16,880.

This invention relates to improvements in friction shock absorbing mechanisms.

One object of the invention is to provide a friction shock absorbing mechanism of high capacity, particularly adapted for railway draft riggings, having relatively light initial or preliminary resistance, followed by heavier frictional resistance during the remainder of the compression stroke.

Another object of the invention is to provide a mechanism of the character indicated, wherein a light preliminary action and a final heavier resistance are had during the compression stroke, the preliminary action being effected by friction elements resisted by a relatively light spring and the heavier final action being effected by certain of said friction elements, cooperating with an additional friction member, having their movement resisted by a heavier spring element.

A further and more specific object of the invention is to provide a friction shock absorbing mechanism, including a friction shell having a plurality of friction shoes cooperating therewith, wherein certain of said shoes have limited movement relative to the remaining shoes to provide for preliminary light action and wherein all of the shoes are adapted to move in unison relatively to the shell during the remainder of the stroke to provide heavier final action, the successive inward movement of the shoes being effected by a wedge pressure transmitting member having two sets of wedge faces cooperating with the shoes.

Other objects and advantages of the invention will more clearly and fully appear from the description and claims hereinafter following.

In the drawings, forming a part of this specification, Figure 1 is a longitudinal, horizontal, sectional view of a railway draft rigging, showing my improvements in connection therewith. Figure 2 is a front end, elevational view of the shock absorbing mechanism proper. And Figure 3 is a transverse, vertical, sectional view, corresponding substantially to the line 3—3 of Figure 1.

In said drawings, 10—10 denote channel shaped center or draft sills having front stop lugs 11—11 and rear stop lugs 12—12 secured to the inner face thereof. A portion of the drawbar is indicated at 13, to which is operatively secured a hooded yoke 14 of well-known form. The shock absorbing mechanism proper, hereinafter more fully described, and front and rear followers 15, are disposed within the yoke, the yoke and the parts therewithin being operatively supported by a detachable saddle plate 16, fixed to the draft sills. As illustrated, the shock absorbing mechanism is of that type employing a substantially cylindrical shell and spring cage casting, and in order to hold the latter in central position, suitable guide plates 17—17 are secured to the inner faces of the respective draft sills.

The improved shock absorbing mechanism proper, comprises broadly, a combined friction shell and spring cage casting A; an outer series of friction shoes B—B; an inner series of friction shoes C—C; a main wedge D; a pressure transmitting spring follower E; a main spring resistance F; an auxiliary spring resistance G; and a retainer bolt H.

The combined friction shell and spring cage is in the form of a casting A having the friction shell proper 18, which is of substantially cylindrical form, formed at the forward end, and the spring cage proper 19, which is of substantially rectangular boxlike form, formed at the rear end. The casting has a transverse, vertical end wall 20 adapted to bear on the rear follower 15. The interior of the friction shell 19 is provided with three independent, cylindrical friction surfaces 21—21, converging inwardly of the shell and so disposed that the rear ends of the surfaces will form a complete, true circle.

The three friction shoes B—B are of like construction, each shoe being provided with an outer, true, cylindrical friction surface 121 adapted to cooperate with the corresponding shell friction surface 21. On the inner side, each shoe is provided with another true, cylindrical friction surface 22 adapted to cooperate with the corresponding shoe C of the inner set. At the forward end, each shoe B has a curved face 23 on the inner side thereof, the face 23 being a section of a true cylindrical surface, and the faces 23 of the respective shoes converging inwardly of the mechanism at a relatively keen angle to the longitudinal axis thereof.

The friction shoes C—C are also all of like construction, each being in the form of a cast block having an outer true cylindrical friction surface 122 adapted to cooperate with the inner friction surface 22 of the corresponding shoe B. Each shoe C also has a wedge face 24 on the inner side thereof, the face 24 of each shoe being disposed at a relatively blunt releasing angle with reference to the longitudinal axis of the mechanism.

The main wedge D is preferably in the form of a cast block and has a flat end face 25 at the forward end thereof adapted to bear directly on the inner surface of the front follower 15. At the inner end, the block G is provided with three converging wedge faces 124, correspondingly inclined to and adapted to cooperate with the three friction wedge shoes C. Forwardly of the wedge faces 124, the wedge block is formed with three true cylindrical surfaces 123—123 converging inwardly of the mechanism, adapted to cooperate with the cylindrical faces 23 of the respective shoes B. As clearly shown in Figure 1, the parts of the mechanism are normally so disposed that the faces 23 and 123 are spaced apart to permit of a limited relative movement between the friction shoes C and B during the initial compression of the mechanism. The shoes B and C are preferably all made of cast steel and the shell made of cast iron. By this arrangement a greater amount of friction exists between the shoes B and the friction shell than between the shoes B and C, thus assuring relative movement of the shoes prior to any movement of the shoes B with reference to the shell during release of the mechanism. However, in order to assure the proper relative positioning of the friction shoes B and C, when the mechanism is in full release, each of the shoes is preferably provided with a lug 26 at the inner end thereof adapted to cooperate with an annular, transverse shoulder 126 formed at the inner end of the friction surfaces of the shell 18.

The spring follower E is in the form of a relatively heavy cap having the flange portion 27 thereof engaging the inner ends of the friction shoes B. The flange portion 27 is also provided with an annular rib 28 on the outer side thereof adapted to cooperate with an annular shoulder 29 on the inside of the spring cage, thereby limiting the outward movement of the spring follower. The main spring resistance F, which preferably consists of a light inner coil and a relatively heavy outer coil is interposed between the inner end of the spring follower cap E and the transverse end wall 20 of the spring cage.

The auxiliary spring resistance G, which also preferably comprises a light inner coil and a relatively heavier outer coil, has its opposite ends bearing respectively on the inner ends of the friction shoes C and the end wall of the spring follower cap E, the rear end of the spring element G being accommodated within the annular flange 27 of the spring cap.

In assembling the parts of the mechanism, the main spring resistance F and the pressure transmitting spring follower E are inserted through an opening in the top wall of the spring cage A, the opening being indicated in dotted lines in Figure 3. It will be evident that the friction shoes B may be assembled with the friction shell either before or after the spring follower and main spring are inserted within the spring cage. After the parts have been thus assembled, the auxiliary spring resistance G, friction shoes C and wedge D are placed in position, the parts being then secured by the retainer bolt H.

The mechanism is held under initial compression and of uniform overall length by the retainer bolt H which has its opposite ends anchored to the spring cage and main wedge respectively. The head of the bolt is seated in a thimble 30 having an annular flange 31 at the rear end thereof, bearing on an annular shoulder 32 surrounding an opening 33 formed in the transverse end wall 20 of the spring cage. The nut at the opposite end of the bolt is accommodated within the hollow portion of the wedge member D, the shank of the bolt extending through alined openings in the wedge D, spring follower E and thimble 30.

Assuming a compression stroke of the mechanism, the operation is as follows: As the followers 15 are moved relatively toward each other, the wedge D will be forced inwardly of the cage A, setting up a wedging action between the same and the shoes B, at the same time spreading the shoes B and forcing the latter into intimate contact with the friction surface 21 of the shell 18. After the wedging action has been set up, upon further relative approach of the followers 15, the friction shoes C will be forced to slip inwardly on the friction surfaces of the shoes B, compressing the auxiliary spring resistance against the spring follower E. During this time, there will be substantially no compression of the main spring resistance F, as the same is placed under a sufficient amount of initial compression when the parts are assembled to prevent inward movement of the follower E at this time. The inward movement of the friction shoes C on the shoes B will continue, until the faces 123 of the wedge D come into abutment with the faces 23 of the shoes B, whereupon the latter will be carried inwardly of the friction shell in unison with the friction shoes C, the frictional resistance being thus transferred to the shoes B and the friction shell. As the friction shoes are moved inwardly of the shell, the pressure transmitting spring follower E which engages the inner ends of the shoes will be carried rearwardly therewith, compressing the main spring F. Due to the taper of the shell, the shoes B and C will be forced laterally inward toward the axis of the mechanism, slipping on the wedge faces of the wedge D, thereby causing the shoes to move rearwardly more rapidly than the wedge and effecting an additional compression of the spring F. The described action will continue either until the actuating force is reduced, or the main follower 15 comes into abutment with the outer end of the spring cage casting, whereupon the pressure will be transmitted directly through the spring cage to the corresponding main follower, thereby preventing the main spring resistance F from being driven solid.

In release, the main and auxiliary springs effectively restore all of the parts to normal position, the lugs 26 on the shoes B limiting the outward movement thereof to properly space the same with reference to the surfaces 123 of the wedge D. In this connection, it is pointed out that during compression of the mechanism a greater spreading action will be exerted on the shoes B when the faces 23 and 123 of the shoes and wedge respectively come into engagement, due to the effective wedging angle of the faces 23 and 123 being keener than the wedging angle of the faces 24 and 124.

The light preliminary action provided in connection with my improved shock absorbing mechanism particularly adapts the same for use in connection with passenger cars, inasmuch as the same effectively cushions the numerous light shocks, as well as the heavier shocks, to which passenger cars are subjected.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a column element having friction surfaces thereon; of a main spring resistance; an auxiliary spring resistance; a plurality of relatively movable cooperating friction elements, certain of which engage with the friction surfaces of said column element and are movable longitudinally thereof and resisted in their movement by said main spring, relative movement of said friction elements being resisted by said auxiliary spring; and wedge pressure transmitting means cooperating with each of said relatively movable friction elements during the compression stroke of the mechanism.

2. In a friction shock absorbing mechanism, the combination with a friction member; of a plurality of cooperating relatively movable friction elements, certain of which have engagement with said member and are relatively movable thereto; pressure transmitting means having a wedge face cooperating with said last named elements and also having additional wedge faces cooperable with the remaining elements all of said wedge faces being operative during the compression stroke of the mechanism, a main spring resistance opposing relative movement of the friction member and the elements having engagement therewith; and an auxiliary spring resistance opposing relative movement of said cooperating friction elements.

3. In a friction shock absorbing mechanism, the combination with a friction member; of a plurality of cooperating, relatively movable friction elements, certain of which have engagement with said member and are relatively movable thereto; pressure transmitting means having a wedge face cooperating with said last named elements and also having additional wedge faces cooperating with the remaining elements, said first named wedge face being normally disengaged from the cooperating elements to permit relative movement of said cooperating elements and provide for preliminary action during compression of the mechanism; a main spring resistance opposing relative movement of the friction member and the elements having engagement therewith; and an auxiliary spring resistance opposing relative movement of said cooperating friction elements.

4. In a friction shock absorbing mechanism, the combination with a friction member; of a plurality of cooperating, relatively movable friction elements, certain of which have engagement with said member and are relatively movable thereto; pressure transmitting means having a wedge face cooperating with said last named elements and also having additional wedge faces cooperating with the remaining elements, said first named wedge face being normally disengaged from the cooperating elements to permit relative movement of said cooperating elements and provide for preliminary action during compression of the mechanism; a spring resistance opposing relative movement of said friction member and the elements having engagement therewith; and an auxiliary spring resistance opposing relative movement of said cooperating friction elements.

5. In a friction shock absorbing mechanism, the combination with a friction member; of a plurality of cooperating, relatively movable friction elements, certain of which have engagement with said member and are relatively movable thereto; pressure transmitting means having a wedge face adapted to cooperate with the friction elements engaging the friction member and having wedge faces cooperating with said remaining friction elements, said last named wedge faces being angularly disposed to said first named face; a main spring resistance opposing relative movement of the friction member and the elements having engagement therewith; and an auxiliary spring resistance opposing relative movement of said cooperating friction elements.

6. In a friction shock absorbing mechanism, the combination with a friction shell having inwardly converging friction surfaces; of a friction wedge system coacting with the shell, said system including a plurality of shoes having limited relative movement, and spreading means, said spreading means and each of said shoes having cooperating wedge faces; a main spring resistance; pressure transmitting means; and an additional spring resistance operatively interposed between certain of said shoes and the pressure transmitting means, said pressure transmitting means directly coacting with the remaining shoes to transmit the actuating force directly therefrom to the main spring resistance after a predetermined compression of said additional spring.

7. In a friction shock absorbing mechanism, the combination with a friction element; of a friction wedge system coacting with said element, said system including a plurality of friction shoes having limited relative movement and spreading means cooperating with the shoes, said spreading means and each of said shoes having cooperating wedge faces; pressure transmitting means; spring resistance elements cooperating with said pressure transmitting means, one of said elements resisting inward movement of certain of said shoes, and the other spring resistance element opposing inward movement of the remaining shoes, said pressure transmitting element directly coacting with said last named shoes.

8. In a friction shock absorbing mechanism, the combination with a friction element having a plurality of friction surfaces; of friction shoes engaging said friction surfaces and relatively movable to said element; a main spring resisting relative movement of said shoes and said element; additional shoes frictionally engaging said first named shoes; an additional spring resisting movement of said additional shoes with reference to the shoes engaging said friction surfaces; and wedge pressure transmitting means having wedge faces adapted to successively engage said additional and first named shoes respectively to actuate the same in sequence and effect successive compression of said additional and main spring resistance elements.

9. In a friction shock absorbing mechanism, the combination with a friction element having a plurality of friction surfaces; of two sets of friction shoes, said sets having cooperating friction surfaces and being relatively movable with reference to each other, and one of said sets having frictional engagement with the friction surfaces of said element; a main spring resistance cooperating with said last named set of shoes; a second spring resistance cooperating with the other set of shoes; a wedge member having a plurality of wedge faces cooperating with the two sets of shoes, the cooperating wedge faces of said wedge and shoes which engage the friction element being normally separated to permit limited relative movement of said two sets of shoes during preliminary action of the mechanism.

In witness that I claim the foregoing I have hereunto subscribed my name this 17th day of March, 1925.

JOHN F. O'CONNOR.